No. 635,299. Patented Oct. 24, 1899.
T. COLLIER.
PLANTER ATTACHMENT FOR CULTIVATORS.
(Application filed Jan. 23, 1899.)
(No Model.) 2 Sheets—Sheet 1.
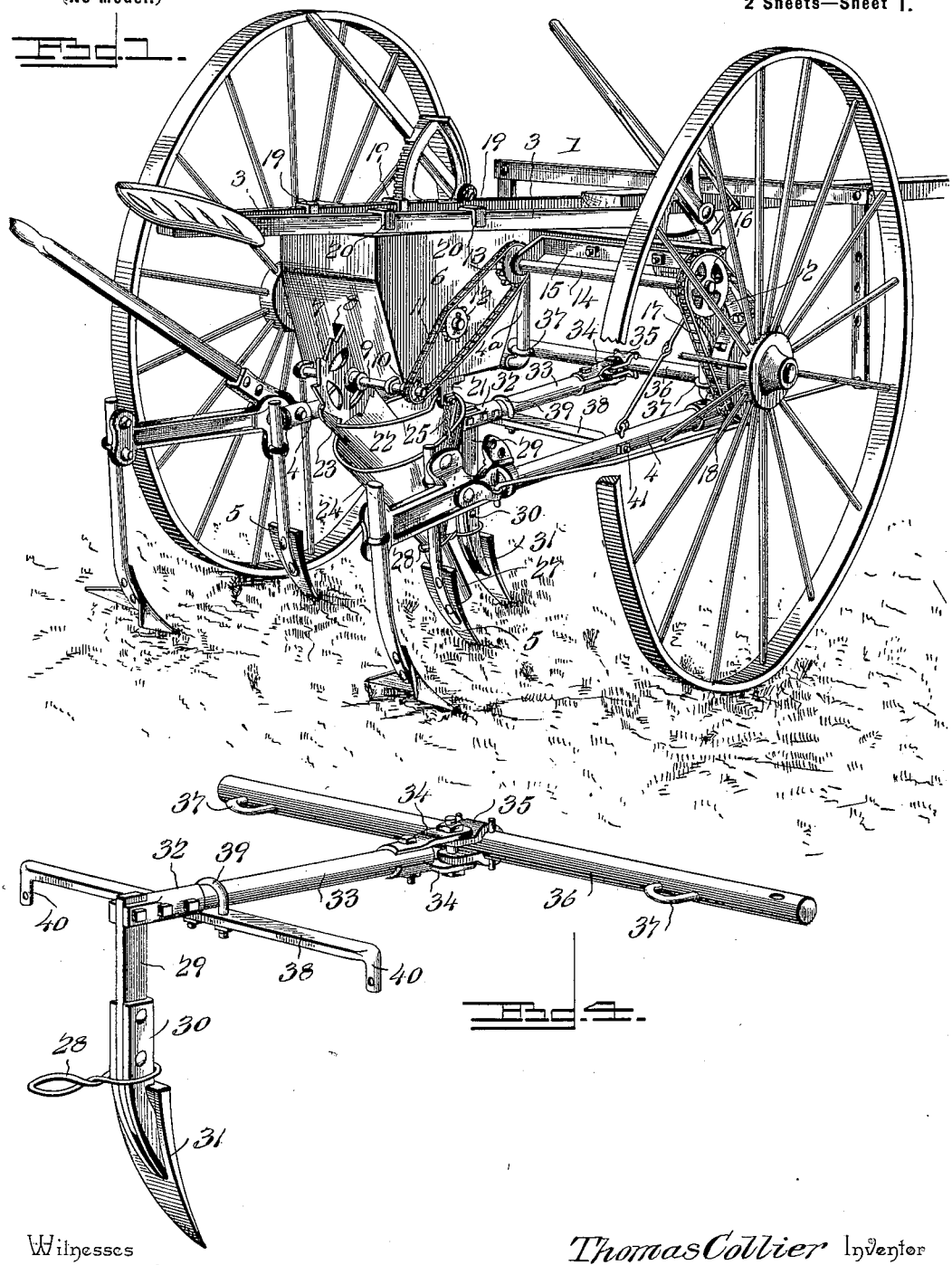
Witnesses Thomas Collier Inventor
By his Attorneys, No. 635,299. Patented Oct. 24, 1899.
T. COLLIER.
PLANTER ATTACHMENT FOR CULTIVATORS.
(Application filed Jan. 23, 1899.)
(No Model.) 2 Sheets—Sheet 2.
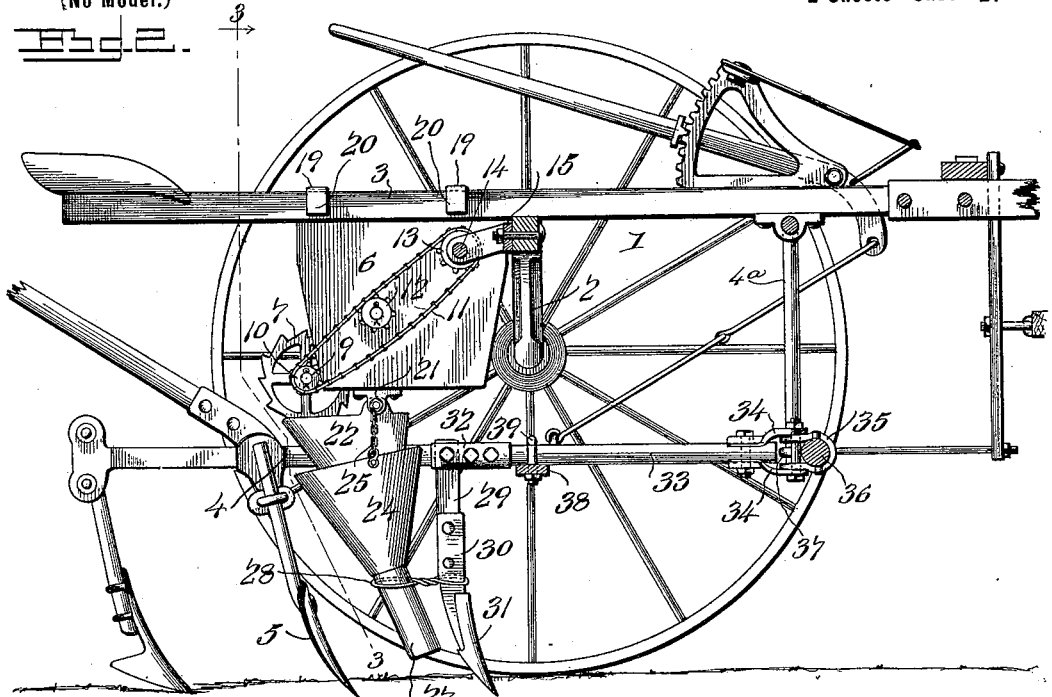
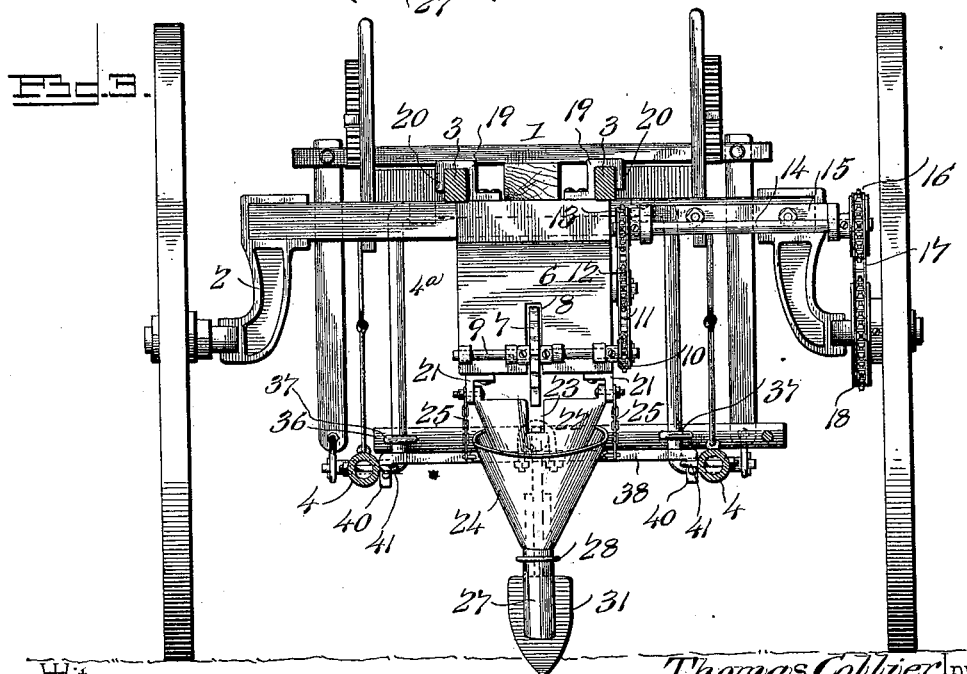

UNITED STATES PATENT OFFICE.

THOMAS COLLIER, OF RIENZI, TEXAS.

PLANTER ATTACHMENT FOR CULTIVATORS.

SPECIFICATION forming part of Letters Patent No. 635,299, dated October 24, 1899.

Application filed January 23, 1899. Serial No. 703,127. (No model.)

*To all whom it may concern:*

Be it known that I, THOMAS COLLIER, a citizen of the United States, residing at Rienzi, in the county of Hill and State of Texas, have invented a new and useful Planter Attachment for Cultivators, of which the following is a specification.

This invention relates to an improved planter attachment for cultivators; and it has for its object to provide a new and useful attachment of this character capable of application to any ordinary type of riding-cultivator and providing simple and efficient means for planting the seed and cultivating the ground at one and the same time.

To this end the invention contemplates a construction of planter attachment that can be adapted for use in connection with a riding-cultivator without any alteration of the latter and which will provide for planting corn or cotton at the time the ground is being cultivated.

With these and other objects in view, which will readily appear as the nature of the invention is better understood, the same consists in the novel construction, combination, and arrangement of parts hereinafter more fully described, illustrated, and claimed.

While the essential or characteristic features of the attachment are necessarily susceptible to modification, still the preferred embodiment of the invention is illustrated in the accompanying drawings, in which—

Figure 1 is a perspective view of a riding-cultivator equipped with a planter attachment constructed in accordance with the present invention. Fig. 2 is a vertical longitudinal sectional view of the construction shown in Fig. 1. Fig. 3 is a transverse sectional view on the line 3 3 of Fig. 2. Fig. 4 is a detail in perspective of the central plow-beam of the attachment, showing its connection with the transverse draft-bar and the coupling-bar.

Referring to the accompanying drawings, the numeral 1 designates an ordinary riding-cultivator, having the usual arched axle 2, the top seat-frame 3, extending rearwardly from the top of the arched axle or bar, and the rearwardly-extending shovel-carrying beams 4, connected with the end portions of the arched draft-frame 4ª in front of the axle and carrying the standards or feet for the cultivating-shovels 5. These are the usual parts of an ordinary riding-cultivator and are not illustrated in detail, as the same form no part of the present invention, but coöperate with the several parts comprising the attachment constituting the present invention.

In carrying out the invention there is employed a seed box or hopper 6 of any ordinary type, such as commonly used in connection with a walking-planter; but in the drawings is shown a seed box or hopper of the type employing a saw-toothed seed-distributing wheel 7, projecting through a slot 8 in the rear side of the box and coöperating in the usual manner with the interior parts of the seeding mechanism. The said seed-distributing wheel 7 is mounted upon the usual shaft 9, journaled at the rear side of the seed box or hopper and carrying at one end a sprocket-wheel 10, which receives motion from a sprocket-chain 11, which also engages with the chain-wheel 12 on the exterior extremity of one of the working shafts of the seeding mechanism to provide for transmitting motion to all of the usual working parts of the seed box or hopper.

The chain 11 receives its motion from a sprocket-wheel 13, mounted on the inner end of a drive-shaft 14, journaled within a U-shaped bearing-bracket 15, bolted or otherwise suitably fastened to the framework at one side of the arched axle or bar of the cultivator. This bearing-bracket and the parts supported thereby constitute a portion of the planter attachment, and at the end opposite the sprocket-wheel 13 the shaft 14 carries a second sprocket-wheel 16, over which passes a driving-chain 17, driven from the main driving-sprocket 18, secured at the inner side of one of the cultivator-wheels. This completes the attachment for transmitting motion to the working parts of the seed box or hopper, which box or hopper is preferably arranged at the under side of the top seat-frame 3 and is held rigidly thereto by means of the hanger-straps 19. The hanger-straps 19 are fastened to the top of the box or hopper 6 and are provided with upper hook ends 20, engaging over the side members of said top seat-frame, thereby providing for supporting the seed box or hopper centrally of the machine and in a proper working position between the shovel-carrying beams.

The seed box or hopper 6 has depending from the under side thereof the oppositely-arranged ears 21, to which is fastened a curved deflecting-chute 22, notched in the upper edge thereof, as at 23, to provide a clearance for the seed-distributing wheel 7 and serving to deflect the seed into the loosely-suspended dropping-spout 24. The dropping-spout 24 is loosely hung in place by the oppositely-arranged hanger-chains 25, attached to the top edges of the spout 24 at opposite points and conveniently fastened to the ears 21 or any other fixed points of attachment beneath the seed or hopper box. The loosely-suspended spout 24 is provided at its lower end with a discharge tube or neck 27, which extends through a retaining-loop 28, attached to the depending plow-standard 29, so as to hold the dropping-spout directly in rear of said standard. The standard 29 carries at its lower end a plow-foot 30, to which is secured the opening-shovel 31, which travels in advance of the dropping-spout to open up the furrow for the seed, and by a proper arrangement of the cultivator-shovels the furrow may be covered up, as will be well understood by those skilled in the art.

To provide for properly centering the standard 29, carrying the opening-shovel 31, the upper end of this standard is secured in a bifurcated coupling-head 32, fastened to the rear end of a central plow-beam 33. The central plow-beam 33 is arranged centrally between the cultivator-beams 4 and carries at its front end a pair of upper and lower clevis-plates 34, pivotally bolted to a clip-plate 35, embracing the horizontal draft-bar 36 of the attachment. The horizontal draft-bar 36 of the attachment extends across the space within the arched draft-frame 4ª of the cultivator and is preferably secured to the upright members of the arched frame by means of the clip-bolts 37, passing through the bar 36 and embracing said members of the axle.

The central plow-beam is maintained in a proper relative position to the cultivator-beam by means of a transverse coupling-bar 38. The coupling-bar 38 carries at a central point between its ends an upwardly-disposed clip 39, loosely receiving therein the central plow-beam 33, and is provided with downturned hook-terminals 40, engaging the loops or eyes 41 at inner sides of the cultivator or shovel carrying beam 4. The coupling-bar 38 therefore serves to couple the several beams together, so that the same will move laterally in unison, and by reason of the loose suspension of the dropping-spout 24 and its connection with the standard 29 it will be obvious that said dropping-spout will swing with the standard, so that the discharge-tube thereof will always maintain its proper relative position to the opening-shovel.

From the foregoing it is thought that the construction, operation, and many advantages of the herein-described planter attachment for cultivators will be readily apparent to those skilled in the art without further description, and it will be understood that changes in the form, proportion, and the minor details of construction may be resorted to without departing from the principle or sacrificing any of the advantages of this invention.

Having thus described the invention, what is claimed as new, and desired to be secured by Letters Patent, is—

1. In a planter attachment of the class described, the combination with the arched frame, the top seat-frame, and the side beams of a riding-cultivator, of a seed box or hopper suspended from the seat-frame and carrying a dropping-spout, a horizontal draft-bar spanning the space within the arched frame, and detachably connected at or near its ends to the upright members of said arched frame, a plow-beam having a pivotal clevis connection at its front end with said draft-bar intermediate the ends of the latter and provided at its rear end with a standard carrying a furrow-opening shovel and a transverse coupling-bar having a clip loosely receiving the plow-beam and provided at its ends with hooks detachably connected with the cultivator-beams, substantially as set forth.

2. In a planter attachment of the class described, the combination with the arched frame, and the top seat-frame of a riding-cultivator, of a seed box or hopper having hanger-straps fitted to the seat-frame, a draft-bar secured to the arched frame, a plow-beam carrying a furrow-opening shovel, and having a connection at its front end with the draft-bar, a dropping-spout having at its upper end flexible hangers loosely connected with the seed box or hopper, said spout having a discharge tube or neck arranged in the rear of the standard carrying the furrow-opening shovel, and a retaining device loosely coupling the discharge tube or neck to said standard, substantially as set forth.

In testimony that I claim the foregoing as my own I have hereto affixed my signature in the presence of two witnesses.

THOMAS COLLIER.

Witnesses:
   EBBIE CARNES,
   G. B. CARNES.